(12) United States Patent
Lee et al.

(10) Patent No.: US 9,495,792 B2
(45) Date of Patent: Nov. 15, 2016

(54) METHOD AND APPARATUS FOR TRAVERSING BINARY TREE IN RAY TRACING SYSTEM

(71) Applicant: Samsung Electronics Co., Ltd., Suwon-si (KR)

(72) Inventors: Jaedon Lee, Yongin-si (KR); Youngsam Shin, Hwaseong-si (KR); Wonjong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/548,669

(22) Filed: Nov. 20, 2014

(65) Prior Publication Data

US 2015/0138202 A1 May 21, 2015

(30) Foreign Application Priority Data

Nov. 20, 2013 (KR) .................. 10-2013-0141751

(51) Int. Cl.
*G06T 15/06* (2011.01)
*G06T 15/00* (2011.01)
*G06T 17/00* (2006.01)

(52) U.S. Cl.
CPC ............. *G06T 15/06* (2013.01); *G06T 15/005* (2013.01); *G06T 17/005* (2013.01)

(58) Field of Classification Search
None
See application file for complete search history.

(56) References Cited

U.S. PATENT DOCUMENTS

| 8,289,324 B1 | 10/2012 | Laine et al. | |
|---|---|---|---|
| 8,502,819 B1 * | 8/2013 | Aila | G06T 15/06 345/419 |
| 2008/0024489 A1 * | 1/2008 | Shearer | G06T 15/50 345/421 |
| 2008/0088619 A1 | 4/2008 | Shearer et al. | |
| 2010/0053162 A1 | 3/2010 | Dammertz et al. | |
| 2012/0131595 A1 | 5/2012 | Kim et al. | |

FOREIGN PATENT DOCUMENTS

KR  10-1284324 B1  7/2013

OTHER PUBLICATIONS

Torres et al., "Ray Casting using a Roped BVH with CUDA," *Proceedings of the 25th Spring Conference on Computer Graphics* (SCCG 2009), 2009, pp. 95-102, conference held Apr. 23-25, 2009, Budmerice, Slovak Republic, ISBN 978-1-4503-0769-7.
Hughes et al., "Kd-Jump: a Path-Preserving Stackless Traversal for Faster Isosurface Ratracing on GPUs," *IEEE Transactions on Visualization and Computer Graphics*, vol. 15, No. 6, Nov./Dec. 2009, pp. 1555-1562.

* cited by examiner

*Primary Examiner* — Daniel Hajnik
(74) *Attorney, Agent, or Firm* — NSIP Law

(57) ABSTRACT

A restart method of traversing a binary tree in a ray tracing system includes traversing a tree consisting of a hierarchical acceleration structure using one-bit stacks respectively assigned to levels of the binary tree and restarting at a highest level at which a corresponding one-bit stack has a value indicating that a child node has not yet been traversed, thereby decreasing the capacity of a stack memory required.

17 Claims, 10 Drawing Sheets

METHOD AND APPARATUS FOR TRAVERSING BINARY TREE IN RAY TRACING SYSTEM

CROSS REFERENCE TO RELATED APPLICATIONS

This application claims the benefit of Korean Patent Application No. 10-2013-0141751 filed on Nov. 20, 2013, in the Korean Intellectual Property Office, the entire disclosure of which is incorporated herein by reference for all purposes.

BACKGROUND

1. Field

This application relates to methods and apparatuses for traversing a binary tree in a ray tracing system.

2. Description of Related Art

A ray tracing method is a method of producing an image by tracing the path of light incident along a ray toward each of pixels of the image from a viewpoint of a camera. In the ray tracing method, a high-quality image may be produced by reflecting the physical properties (e.g., reflective, refractive, and transmissive properties) of light into a rendering result.

Thus, the ray tracing method has been widely applied to the field of three-dimensional (3D) rendering, e.g., movies or animation, in which scenes are more realistically rendered. The ray tracing method is, however, relatively complicated and slow in calculation, compared to a rasterization method in which an image is produced while projecting a 3D object on a screen, and has thus been considered as a non-real-time rendering method. However, recently, as hardware has been advanced and research has been conducted on a spatial data structure for accelerating an intersection calculation acceleration, a real-time ray tracing method has been introduced.

In ray tracing, a hierarchical acceleration structure is used to detect an adjacent primitive that intersects a ray. Representative examples of spatial acceleration structures that have been widely used include a k-dimensional (k-d) tree, a bounding volume hierarchy (BVH), and a grid.

The k-d tree has been known as a fastest intersection calculation data structure for a static scene. However, since it takes a certain time to build the k-d tree for a scene, a time required to rebuild the k-d tree for a dynamic scene is a heavy burden on performing real-time rendering, unlike for the static scene. To solve this problem, for the past several years, research has been conducted on a BVH, a grid, and other structures that have a relatively low intersection calculation acceleration performance compared to the k-d tree, but can be rapidly built for a dynamic scene.

In ray tracing performance, a large amount of calculation is required to generate a hierarchical acceleration structure by spatially splitting primitives to be rendered, traverse the hierarchical acceleration structure, and conduct an intersection test between a ray and a primitive.

To traverse the hierarchical acceleration structure and conduct the intersection test, stacks are basically required to store information regarding nodes to be processed. If hardware or a graphic processing unit (GPU) is used to process a large number of rays at the same time, the number of stacks should be the same as the number of rays.

However, the use of stacks may be limited by a limited storage space or bandwidth. In this case, a stackless algorithm that does not require a stack may be used to skip a stack operation, or a short stack algorithm using a fixed sized buffer that can replace the stack operation may be used. In these algorithms, when an end node is reached while traversal is performed, the traversal is restarted starting from a root node to traverse another node that has not yet been traversed. In the case of a BVH tree, stackless or short stack traversal is performed using a restart trail method.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of traversing a binary tree in a ray tracing system includes testing whether child nodes intersect a ray while traversing the binary tree, wherein one-bit stacks are respectively assigned to levels of the binary tree; in response to the intersection testing revealing that a number of child nodes intersecting the ray is two, setting a bit of the one-bit stack assigned to a tree level of a parent node to a first value and pushing one of the child nodes to a stack; in response to a traversed node being a leaf node or no child node intersecting the ray, setting a highest level among levels of the one-bit having bit values set to the first value to be a pop level and changing a bit of the one-bit stack corresponding to the pop level to a second value; and beginning the traversal again starting from a root node, and traversing a node that has not yet been traversed among child nodes intersecting a ray at the pop level in response to the pop level being reached.

The setting of the bit of the one-bit stack to the first value may include, in response to the intersection testing revealing that both of the two child nodes intersect the ray, setting the bit of the one-bit stack corresponding to the tree level of the parent node to the first value, moving to a near child node at which the ray first arrives among the two child nodes, and traversing the near child node; in response to the intersection testing revealing that only one of the two child nodes intersects the ray, moving to the child node intersecting the ray, and traversing the child node; and in response to the intersection testing revealing that neither of the two child nodes intersects the ray, checking the bits of the one-bit stacks.

The setting of the highest level to be the pop level and the changing of the bit of the one-bit stack corresponding to the pop level to be the second value may include ending the traversing of the binary tree in response to all of the bits of the one-bit stacks having the second value; and in response to some of the bits of the one-bit stacks having the first value, setting a highest level among the one-bit stacks having bit values set to the first value to the pop level, and changing the bit of the one-bit stack corresponding to the pop level to the second value.

The beginning of the traversal again starting from the root node and the traversing of the node that has not yet been traversed may include beginning the traversal again starting from the root node, and testing whether child nodes intersect a ray at the pop level in response to the pop level being reached; in response to a result of checking whether child nodes intersect the ray at the pop level revealing that two child nodes intersect the ray, moving to a far child node other than the near child node among the two child nodes, and traversing the far child node; in response to the result of checking whether child nodes intersect the ray at the pop level revealing that only one of the two child nodes intersects the ray, performing the setting of the highest level to be the pop level and the changing of the bit of the one-bit stack corresponding to the pop level to the second value; and detecting an intersection point by checking whether a primitive and a ray intersect each other in response to a node that is currently being traversed being a leaf node, and decreasing the length of the ray in response to the intersection point being detected.

In another general aspect, a method of traversing a binary system in a ray tracing system includes testing whether child nodes intersect a ray while traversing the binary tree, wherein one-bit stacks are respectively assigned to levels of the binary tree; in response to the intersection testing revealing that both of two child nodes intersect the ray, pushing a far child node among the two child nodes to a short stack, setting a bit of the one-bit stack corresponding to a tree level of a parent node to a first value, and moving to a near child node at which the ray first arrives among the two child nodes; in response to the intersection testing revealing that only one of the two child nodes intersects the ray, moving to the child node intersecting the ray, and traversing the child node intersecting the ray; in response to a traversed node being a leaf node or the intersection testing revealing that no child node intersects the ray, setting a highest level among levels of the one-bit stacks having bit values set to the first value to be a pop level, and changing a bit of the one-bit stack corresponding to the pop level to a second value; popping the short stack at the pop level to move to a desired node, and traversing the desired node; and in response to the short stack being unoccupied, beginning the traversal starting again from a root node, and traversing a node that has not yet been traversed among child nodes intersecting a ray at the pop level in response to the pop level being reached.

The beginning of the traversal starting again from the root node and the traversing of the node that has not yet been traversed may include, in response to the short stack being unoccupied, beginning the traversal again starting from the root node and checking whether child nodes intersect a ray at the pop level in response to the pop level being reached; in response to a result of checking whether child nodes intersect the ray at the pop level revealing that both of two child nodes intersect the ray, moving to a far child node other than a near child node among the two child nodes, and traversing the far child node; in response to the result of checking whether child nodes intersect the ray at the pop level revealing that only one of the two child nodes intersects the ray, setting a highest level among levels of the one-bit stacks having bit values set to the first value to be the pop level, and changing a bit of the one-bit stack corresponding to the pop level to the second value; beginning the traversal again starting from the root node, and traversing a node that has not yet been traversed among child nodes intersecting a ray at the pop level in response to the pop level being reached; and detecting an intersection point by checking whether a primitive and a ray intersect each other in response to a node that is currently being traversed being a leaf node, and decreasing the length of the ray in response to the intersection point being detected.

In another general aspect, an apparatus for traversing a binary tree for ray tracing includes a processor configured to traverse the binary tree for ray tracing; and a memory configured to store one-bit stacks respectively assigned to levels of the binary tree, and store the binary tree; wherein the processor is further configured to test whether child nodes intersect a ray while traversing the binary tree; set a bit of the one-bit stack assigned to a tree level of a parent node to a first value only in response to the intersection testing revealing that a number of child nodes intersecting the ray is two; set a highest level among levels of the one-bit stacks having bit values et to the first value to be a pop level and change a bit of a one-bit stack corresponding to the pop level to a second value in response to a traversed node being a leaf node or no child node intersecting the ray; and begin the traversal again starting from a root node, and traverse a node that has not yet been traversed among child nodes intersecting a ray at the pop level in response to the pop level being reached.

The apparatus may further include a bus; and the processor may be further configured to communicate with the memory and a display via the bus.

The memory may include a short stack configured to store an address of a far child node at which the ray later arrives among two child nodes in response to the number of the child nodes intersecting the ray being two.

The processor may be further configured to set a highest level among levels of the one-bit stacks having bit values set to the first value to be the pop level; change a bit of the one-bit stack corresponding to the pop level to a second value; pop the short stack at the pop level to move to a desired node; and traverse the desired node in response to a traversed node being a leaf node or the intersection testing revealing that no child node intersects the ray.

In another general aspect, a non-transitory computer-readable storage medium stores a computer program for controlling a computer to perform a method of traversing a binary tree in a ray tracing system, the method including testing whether child nodes intersect a ray while traversing the binary tree, wherein one-bit stacks are respectively assigned to levels of the binary tree; setting a bit of the one-bit stack assigned to a tree level of a parent node to a first value in response to the intersection testing revealing that a number of child nodes intersecting the ray is two; setting a highest level among levels of the one-bit stacks having bit values set to the first value to be a pop level and changing a bit of the one-bit stack corresponding to the pop level to a second value in response to a traversed node being a leaf node or no child node intersecting the ray; and beginning the traversal again starting from a root node, and traversing a node that has not yet been traversed among child nodes intersecting a ray at the pop level in response to the pop level being reached.

Other features and aspects will be apparent from the following detailed description, the drawings, and the claims.

DETAILED DESCRIPTION

Figure 1:
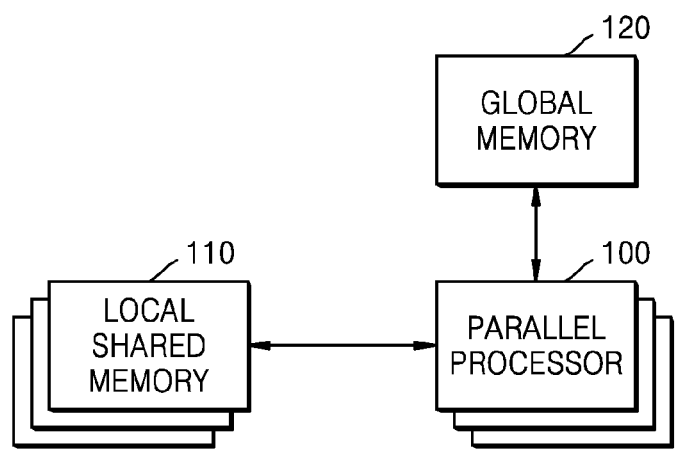
FIG. 1 illustrates an example of a system capable of performing a method of traversing a binary tree in a ray tracing system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 illustrates an example of a system capable of performing a method of traversing a binary tree in a ray tracing system. Referring to FIG. 1, the system includes a parallel processor 100 including a plurality of processors and capable of processing a large number of threads. The plurality of processors may process a large amount of graphic data in parallel to efficiently process the graphic data. The system further includes a local shared memory 110. The local shared memory 110 includes a plurality of memories. The plurality of memories are respectively assigned to the plurality of processors, and each of the plurality of processors reads data from the memory assigned thereto and stores processed data in that memory. The system further includes a global memory 120. The global memory 120 may be used by the plurality of processors and may be mounted on an integrated circuit. The system may further include a driver (not shown) configured to control the plurality of processors.

Figure 2:
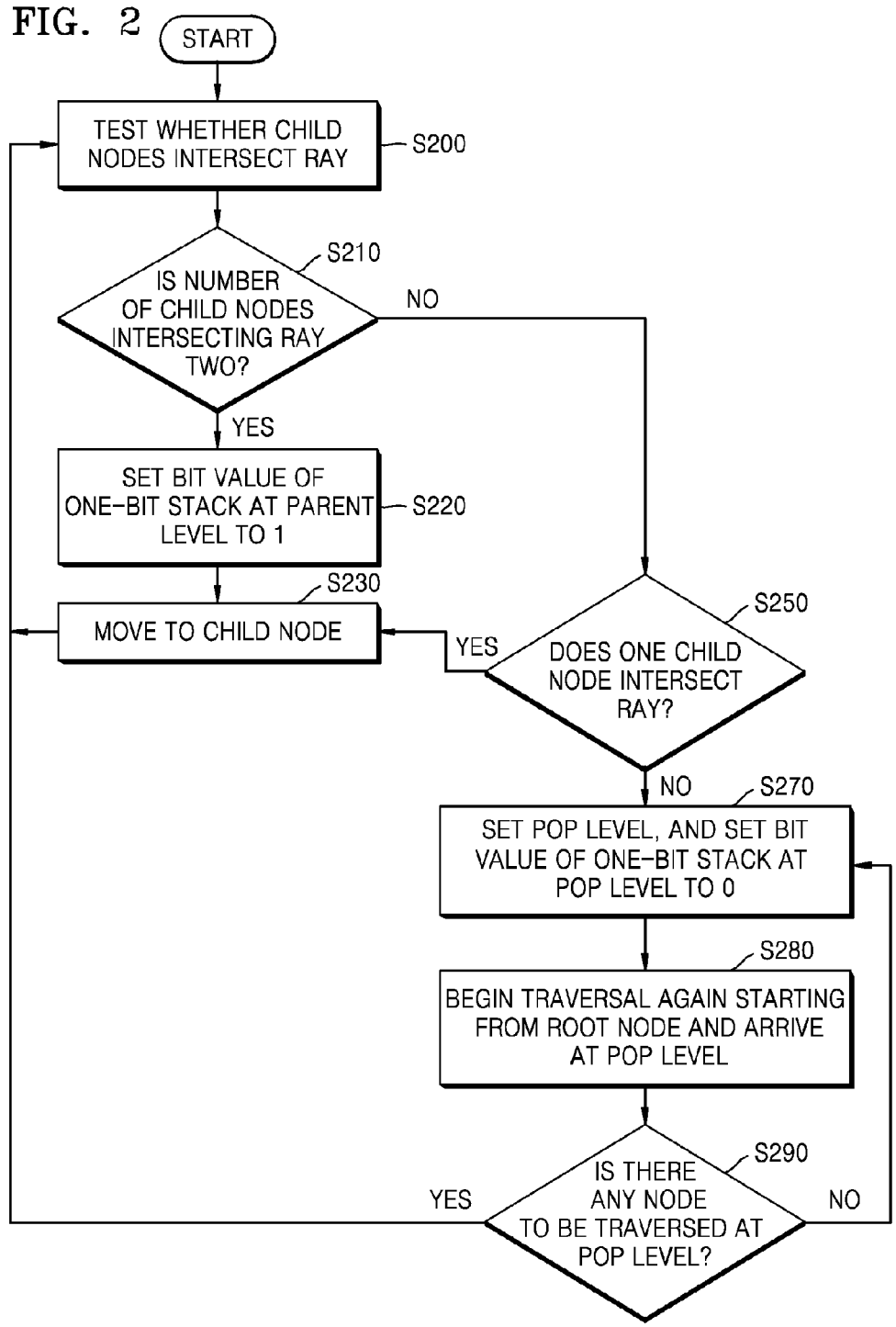
FIG. 2 illustrates an example of a method of traversing a binary tree in a ray tracing system.

FIG. 2 illustrates an example of a method of traversing a binary tree in a ray tracing system.

First, one-bit stacks are respectively assigned to levels of the binary tree (not shown). Whether child nodes intersect a ray is tested while the binary tree is traversed (operation S200).

When the intersection test reveals that the number of child nodes intersecting the ray is two (operation S210), a bit value of a one-bit stack assigned to a tree level of a parent node is set to a first value, e.g., '1' (operation S220). Then, the traversal moves to one of the two child nodes and continues with the child node (operation S230). A node at which the ray first arrives among the two child nodes is a near child node, and the traversal may move to the near child node and continue with the near child node. Then, whether child nodes intersect the ray is tested (operation S200). If it is determined in operation S200 that child nodes intersect the ray, operation S210 is performed to check whether the number of the child nodes that intersect the ray is two.

When the intersection test reveals that the number of child nodes intersecting the ray is not two (operation S210), whether one child node intersects the ray is tested (operation S250). If it is determined that one child node intersects the ray (operation S250), the traversal moves to the child node intersecting the ray and continues with that child node (operation S230).

If it is determined that the traversed node is a leaf node or no child node intersects the ray (operation S250), the bit values of the one-bit stacks are checked, a highest level among levels of the one-bit stacks having bit values set to the first value, e.g., '1', is set to be a pop level, and a bit value of the one-bit stack having a level corresponding to the pop level is changed to be a second value, e.g., '0' (operation S270).

Figure 3:
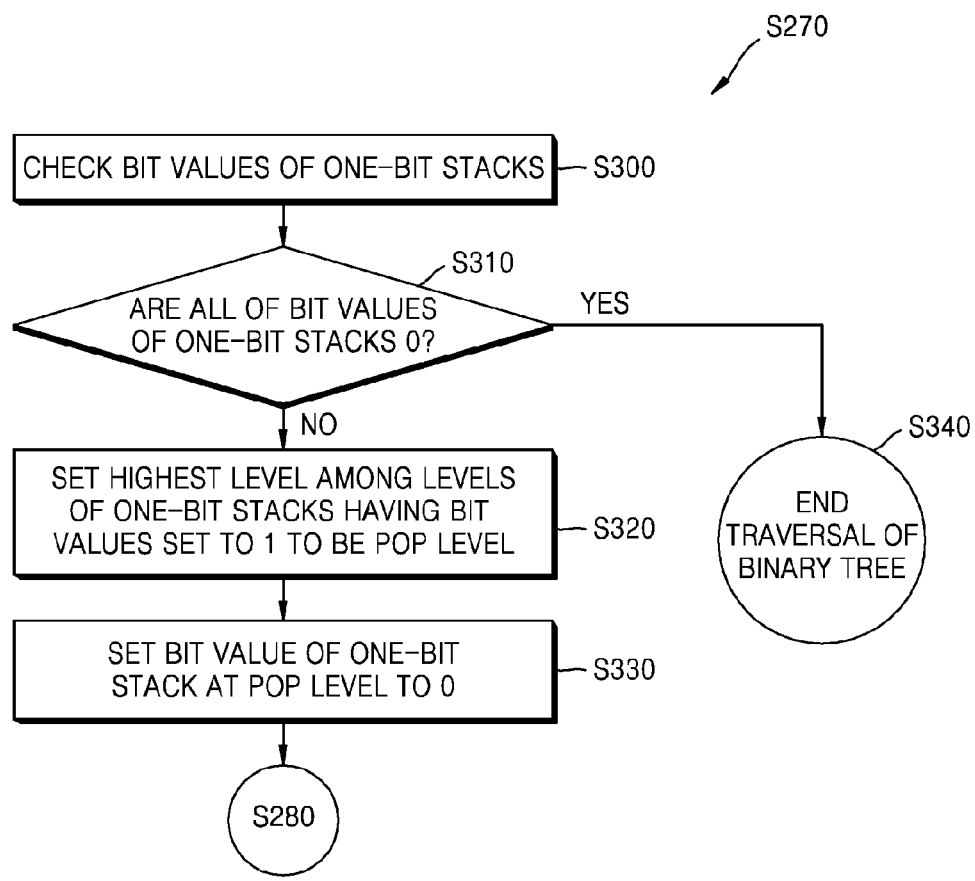
FIG. 3 is a detailed flowchart of operation S270 of FIG. 2.

FIG. 3 is a detailed flowchart of operation S270 of FIG. 2. Referring to FIG. 3, the bit values of the one-bit stacks are checked (operation S300). When it is determined that all of the bit values of the one-bit stacks are the second value, e.g., '0' (operation S310), the traversal of the binary tree is ended (operation S340).

When it is determined that some of the bit values of the one-bit stacks are set to the first value, e.g., '1' (operation S310), a highest level among levels of one-bit stacks having bit values set to the first value, e.g., '1', is set to be a pop level (operation S320). Then, the bit value of the one-bit stack assigned to the level corresponding to the pop level is changed to be the second value, e.g., '0' (operation S330).

Referring back to FIG. 2, the traversal begins again starting from a root node and arrives at the pop level (operation S280). When the pop level is reached, it is determined whether there is any node to be traversed at the pop level (operation S290). When it is determined in operation S290 that there is a node to be traversed at the pop level, operation S200 is performed. When it is determined in operation S290 that there is no node to be traversed at the pop level, operation S270 is performed.

Figure 4:
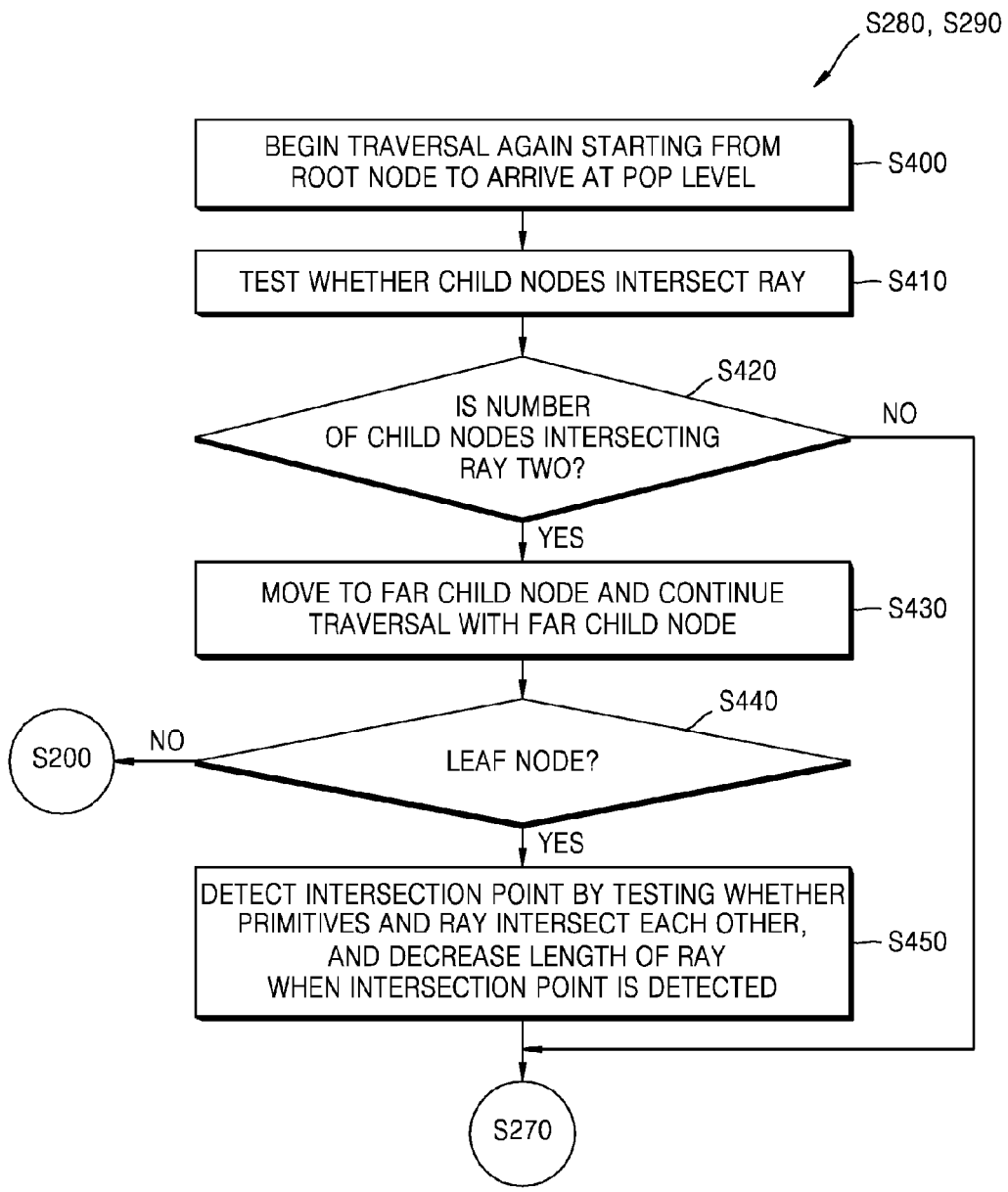
FIG. 4 is a detailed flowchart of operations S280 and S290 of FIG. 2.

FIG. 4 is a detailed flowchart of operations S280 and S290 of FIG. 2. Referring to FIG. 4, when the traversal begins again starting from the root node to arrive at the pop level (operation S400), whether child nodes of a node corresponding to the pop level intersect a ray is checked (operation S410).

When it is determined that the number of child nodes intersecting the ray at the pop level is two (operation S420), a node at which the ray first arrives among the two child nodes is set to be a near child node and the other node at which the ray later arrives is set to be a far child node, and the traversal moves to the far child node and continues with the far child node (operation S430).

When it is determined that a node currently being traversed is a leaf node (operation S440), the node consists of primitives. Thus, an intersection point is detected by testing whether the primitives and the ray intersect each other, and the length of the ray is decreased when the intersection point is detected by setting a maximum length of the ray to be equal to a distance from an origin of the ray to the intersection point (operation S450). Then, operation S270 is performed. If it is determined that the node currently being traversed is not a leaf node after operation S430 is performed (operation S440), operation S200 is performed to test whether child nodes and a ray intersect each other.

If it is determined in operation S420 that the number of child nodes intersecting the ray at the pop level is not two, i.e., it is determined only one child node intersects the ray, operation S270 is performed to perform a pop operation.

The pop operation is performed as follows. When all of the bit values of the one-bit stacks are checked and it is determined that all of the bit values are a second value, e.g., '0', there is no node to be traversed and tree traversal is thus ended. If any of the bit values of the one-bit stacks is a first value, e.g., '1', a highest level among levels of the one-bit shaving bit values set to '1' is set to be a pop level. Then, tree traversal begins again starting from a root node to arrive at the pop level, the traversal moves to a far child node, and the traversal continues with the far child node.

Figure 5:
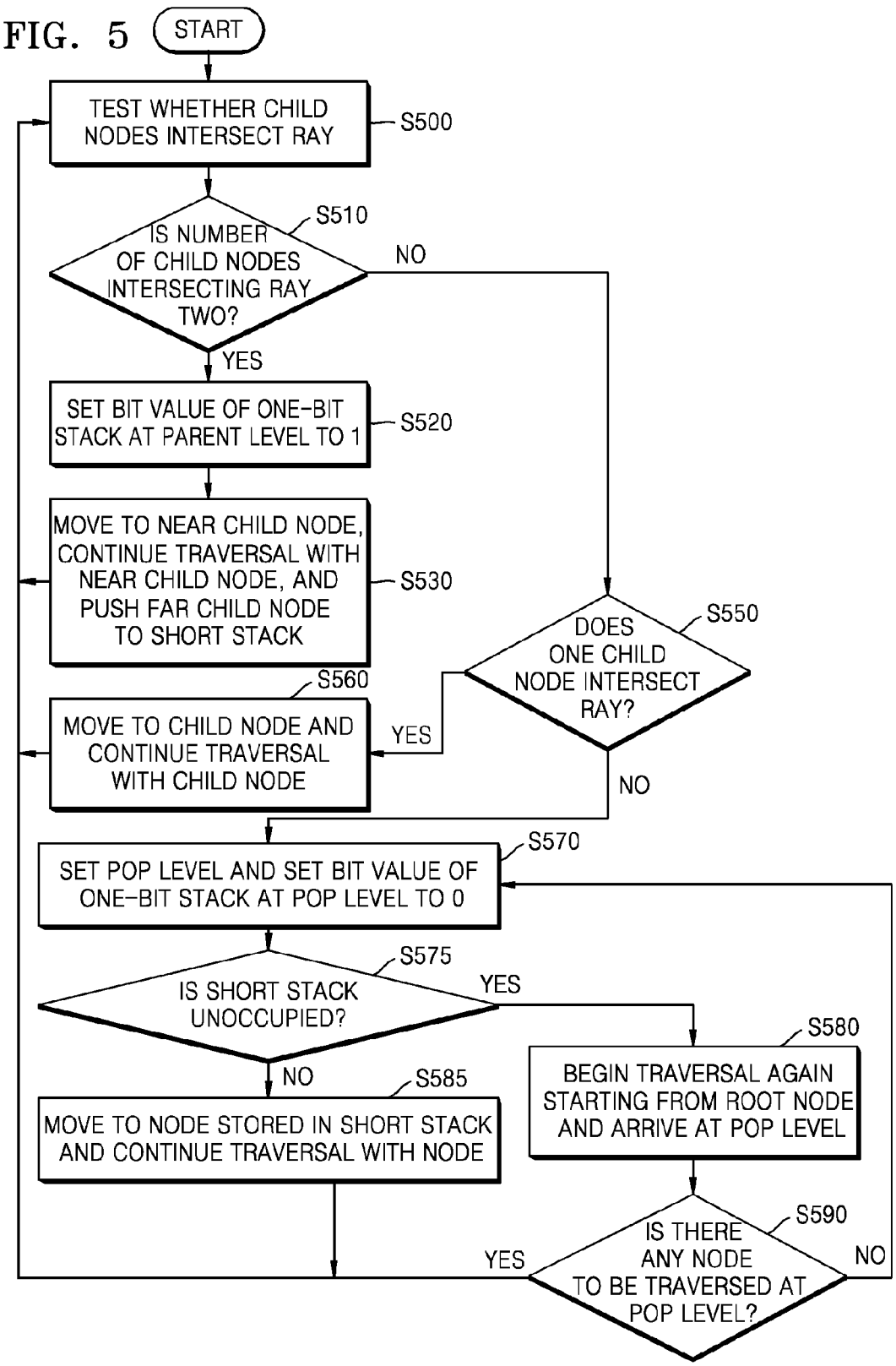
FIG. 5 illustrates another example of a method of traversing a binary tree in a ray tracing system.

FIG. 5 illustrates another example of a method of traversing a binary tree in a ray tracing system. Referring to FIG. 5, one-bit stacks are respectively assigned to levels of the binary tree. Whether child nodes intersect a ray is tested while traversing the binary tree (operation 500).

When the intersection test reveals that the number of child nodes intersecting the ray is two (operation S510), a bit value of the one-bit stack assigned to a tree level of a parent node is set to be a first value, e.g., '1' (operation S520). Then, the traversal moves to one of the two child nodes and continues with that child node (operation S530). A node at which a ray first arrives among the two child nodes is set to be a near child node and the other node at which the ray later arrives is set to be a far child node. The traversal moves to the near child node and continues with the near child node, and the far child node is pushed to a short stack (operation S530). The short stack stores the address of a far child node when two child nodes intersect a ray, and the size of the short stack may be set to be much smaller than that of a general stack. Then, whether child nodes intersect a ray is tested (operation S500).

When the intersection test reveals that the number of child nodes intersecting the ray is not two (operation S510), whether one child node intersects the ray is tested (operation S550). When it is determined that one child node intersects the ray, i.e., when the intersection test reveals that only one child node intersects the ray (operation S550), the traversal moves to the child node intersecting the ray continues with that child node (operation S560).

If the traversed child node is a leaf node or no child node intersects the ray (operation S550), a highest level among levels of the one-bit having bit values set to be the first value, e.g., '1', is set to be a pop level by checking the bit values of the one-bit stacks, and a bit value of the one-bit stack corresponding to the pop level is changed to be a second value, e.g., '0' (operation S570).

Figure 6:
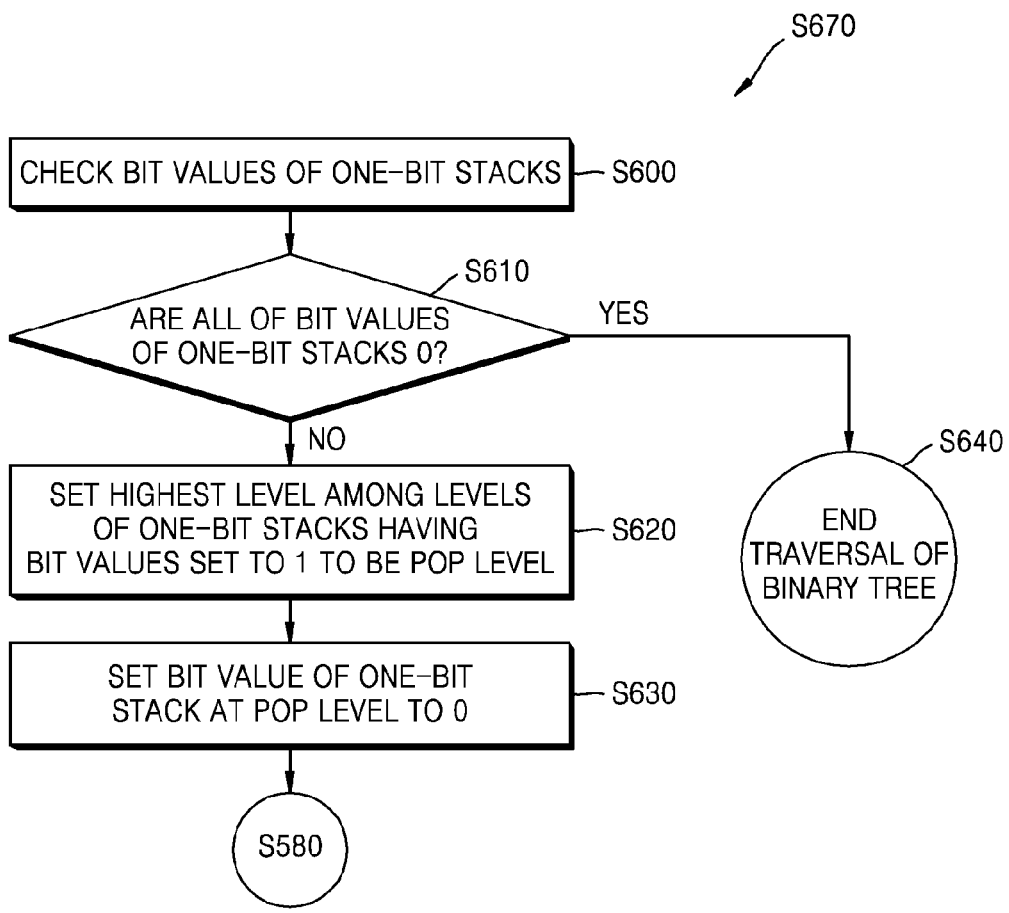
FIG. 6 is a detailed flowchart of operation S570 of FIG. 5.

FIG. 6 is a detailed flowchart of operation S570 of FIG. 5. Referring to FIG. 6, bit values of one-bit stacks are checked (operation S600). When all of the bit values of the one-bit stacks are a second value, e.g., '0' (operation S610), the traversal of the binary tree is ended (operation S640).

When some of the bit values of the one-bit stacks are set to a first value, e.g., '1' (operation S610), a highest level among levels of the one-bit stacks having bit values set to the first value, e.g., '1', is set to be a pop level (operation S620), and the bit value of the one-bit stack corresponding to the pop level is changed to be the second value, e.g., '0' (operation S630).

Then, referring again to FIG. 5, whether a short stack is unoccupied is checked (operation S575). If the address of a node is stored in the short stack, the traversal moves to that node and continues with that node (operation S585). If the short stack is unoccupied, the traversal begins again starting from a root node and arrives at the pop level (operation S580). When the pop level is reached, it is determined whether there is any node to be traversed at the pop level (operation S590). When it is determined in operation S590 that there is a node to be traversed at the pop level, operation S500 is performed. When it is determined in operation S590 that there is no node to be traversed at the pop level, operation S570 is performed.

Figure 7:
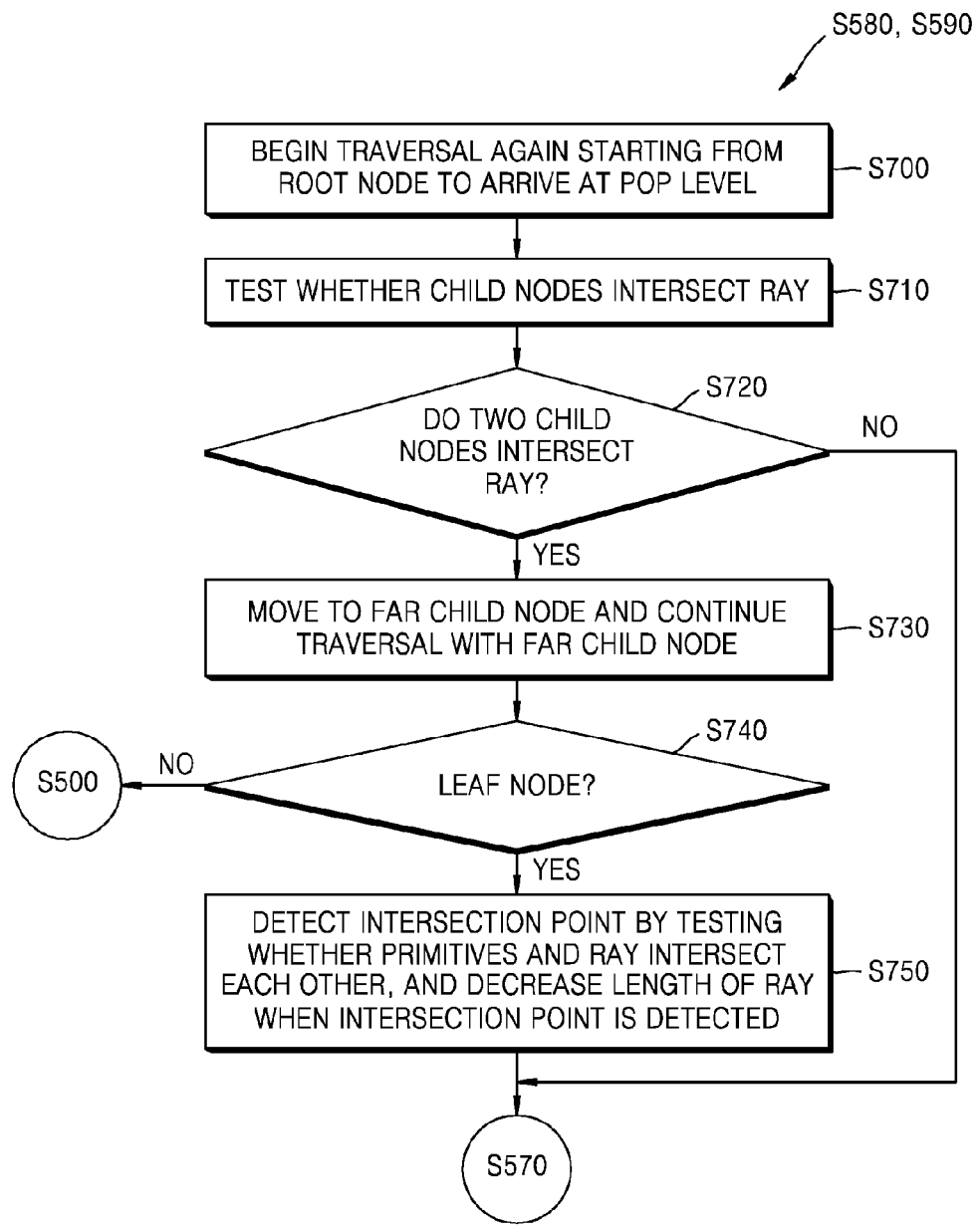
FIG. 7 is a detailed flowchart of operations S580 and S590 of FIG. 5.

FIG. 7 is a detailed flowchart of operations S580 and S590 of FIG. 5. Referring to FIG. 7, the tree traversal begins again starting from the root node to arrive at the pop level (operation S700). Then, whether child nodes of a node corresponding to the pop level intersect a ray is tested (operation S710).

When the intersection test reveals that that two child nodes intersect the ray at the pop level (operation S720), a node at which the ray first arrives among the two child nodes is set to be a near child node and the other node at which the ray later arrives is set to be a far child node, and the traversal continues with the far child node (operation S730).

If a node currently being traversed is a leaf node (operation S740), the node consists of primitives. Thus, an intersection point is detected by testing whether the primitives and the ray intersect each other, and the length of the ray is decreased when the intersection point is detected (operation S750). Then, operation S570 is performed. If it is determined that the node currently being traversed is not a leaf node after operation S730 is performed (operation S740), operation S500 is performed to test whether child nodes and a ray intersect each other.

If it is determined in operation S720 that the number of child nodes intersecting the ray is not two, i.e., it is determined that only one child node intersects the ray, operation S570 is performed to perform a pop operation.

The pop operation is performed as follows. All of the bit values of the one-bit stacks are checked. When all of the bit values of the one-bit stacks are a second value, e.g., '0', there is no node to be traversed and the traversal of the binary tree is thus ended. If any of the bit values of the one-bit stacks is the first value, e.g., '1', a highest level among levels set to '1' is set to be a pop level. Child nodes of a node having the highest level are popped, and the bit value of the one-bit stack at the pop level is changed to '0' since child nodes to be traversed are not included in the one-bit stack.

If a short stack is unoccupied, the traversal begins again starting from the root node. If the address of a node is stored in the short stack, the traversal moves to that node and continues with that node. When the traversal begins again starting from the root node, first, the pop level is moved to. When two child nodes intersect the ray and a bit value of a one-bit stack corresponding to the pop level is '1', a far child node should be further stored in the one-bit stack, a near child node is moved to, and the far child node is stored in the one-bit stack. If only one child node intersects the ray, the traversal moves to the child node. If the pop level is reached while the restarting of the traversal is performed, a far child node is to be traversed, and the traversal moves to the far child node and continues with the far child node when two child nodes intersect the ray. When only one child node intersects the ray, this means that the length of the ray was decreased in a previous primitive intersection test and the ray does not intersect the far child node. Thus, the pop operation is performed again. If a node to be traversed is a leaf node, an intersection point is detected by performing the intersection test on primitives and the ray, and the length of the ray is decreased when the intersection point is detected. Then, in order to continue the traversal, a stack is popped to select another node.

Figure 8A:
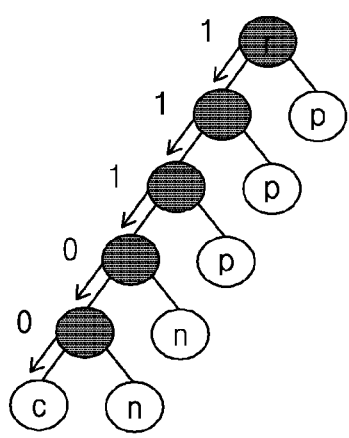
FIGS. 8A and 8B illustrate an example of a tree traversal process for explaining a method of traversing a binary tree in a ray tracing system.
Figure 8B:
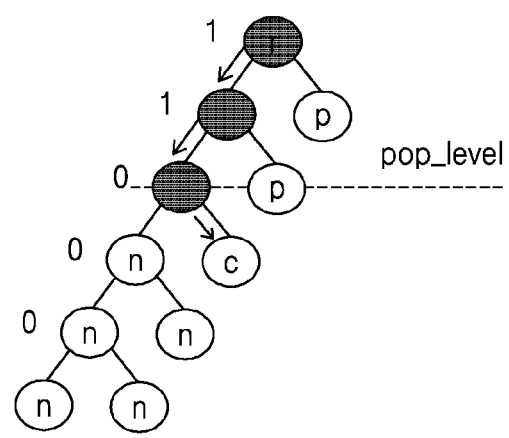

FIGS. 8A and 8B an example of a tree traversal process for explaining a method of traversing a binary tree in a ray tracing system.

In FIGS. 8A and 8B, 'r' denotes a root node, 'c' denotes a node that is currently being traversed, 'p' denotes a node to be popped, and 'n' denotes a node, the bounding box of which does not intersect a ray or that has already been traversed and will thus not be traversed. Also, the numbers '0' and '1' added at a side of a tree denote bit values of one-bit stacks assigned to levels of the tree. When the bit value of a one-bit stack is '0', it should be understood that the address of a child node is not stored in the short stack. When the bit value of a one-bit stack is '1', it should be understood that the address of a child node is pushed to the short stack.

Referring to FIG. 8A, the node c is a leaf node and a stack assigned thereto is to be popped. Referring to FIG. 8B, a highest level among levels of one-bit stacks having bit values set to '1' is determined to be a pop level, and the pop operation is performed on the one-bit stack having the highest level, thereby changing the bit value of the pop level to be '0'.

Referring to FIG. 8B, traversal begins again starting from the root node r, the traversal moves to a near child node when a current tree level is lower than the pop level, and the bit value of the one-bit stack of the current tree level is set to '1'. When the pop level is reached, the traversal moves to a far child node, and then moves to a node that is to be popped.

FIGS. 9A through 9E illustrate an example of a tree traversal process using a pop level included in a method of traversing a binary tree in a ray tracing system.

Figures 9A, 9B, 9C, 9D:
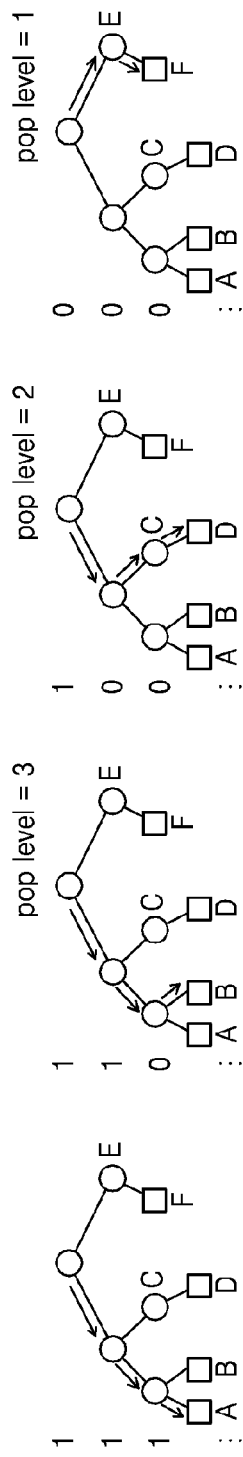
FIGS. 9A though 9E illustrate an example of a tree traversal process using a pop level included in a method of traversing a binary tree in a ray tracing system.

FIG. 9A illustrates a case in which traversal is performed on a leaf node A starting from a root node located at the top of a tree. Since bit values of one-bit stacks of levels of the tree are '1', this means that child nodes of each node intersect a ray.

FIG. 9B illustrates a case in which the node A of FIG. 9A is a leaf node, a pop level thereof is set to '3', and the traversal continues with a child node B at the pop level. When bit values of some of the one-bit stacks of levels of the tree are '1', a highest level among the levels that are set to '1' is determined to be the pop level. Referring to FIG. 9B, a level 3 among the levels that are set to '1' is a highest level and is thus determined to be the pop level. Then, the bit value of the one-bit stack at the level 3 is changed to be '0'

FIG. 9C illustrates a case in which the child node B of FIG. 9B is a leaf node, a pop level thereof is set to two, the traversal moves to a child node C at the pop level and continues with the child node C, and then the traversal moves to a child node D of the child node C and continues with the child node D.

FIG. 9D illustrates a case in which the child node D of FIG. 9C is a leaf node, a pop level thereof is set to '1', the traversal moves to a child node E at the pop level and continues with the child node E, and then the traversal moves to a child node F of the child node E and continues with the child nod F.

Figure 9E:
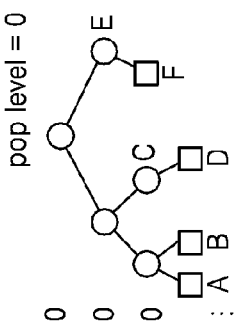

FIG. 9E illustrates a case in which the child node F of FIG. 9D is a leaf node, a pop level thereof is set to '0' since all of bit values of one-bit stacks are '0', and thus the traversal is ended.

An example of an apparatus for traversing a binary tree in a ray tracing system includes a memory that stores a program for performing a method of traversing a binary tree, and a processor configured to execute the program.

Figure 10:
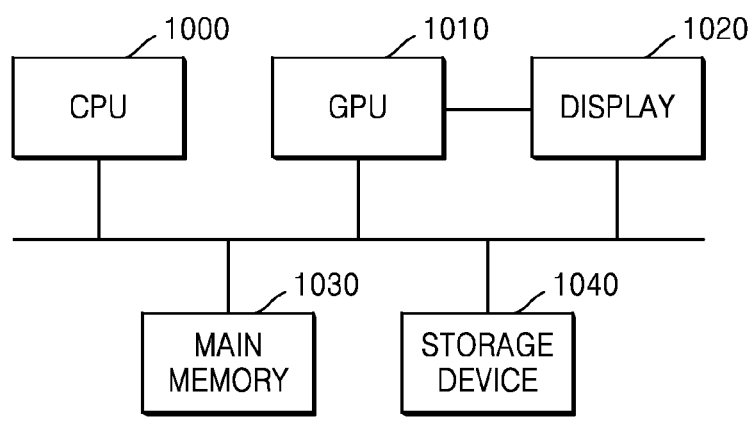
FIG. 10 illustrates an example of a system including memories and processors that is an example of an apparatus for traversing a binary tree in a ray tracing system.

FIG. 10 illustrates an example of a system including memories 1030 and 1040 and processors 1000 and 1010 that is an example of an apparatus for traversing a binary tree in a ray tracing system. The system further includes a display device 1020 configured to display a result of executing the program by the processor.

The processors 1000 and 1010 (a main memory 1030 and a storage device 1040) traverse a binary tree for ray tracing. The memories 1030 and 1050 (a CPU 1000 and a GPU 1010) provide one-bit stacks for levels of the binary tree and store the binary tree.

The processors 1000 and 1010 execute program code to test whether child nodes intersect a ray while traversing the binary tree. Also, the processors 1000 and 1010 set a bit value of a one-bit stack assigned to a tree level of a parent node to a first value, e.g., '1', only when the intersection test reveals that the number of child nodes intersecting the ray is two.

Also, the processors 1000 and 1010 set a highest level among levels of the one-bit stacks having bit values set to the first value, e.g., '1', to be a pop level, and change a bit value of the one-bit stack corresponding to the pop level to be a second value, e.g., '0', when a traversed node is a leaf node or no child node intersects the ray.

Also, the processors 1000 and 1010 begin traversal again starting from a root node, and traverse a node that has not been traversed among child nodes intersecting the ray at the pop level when the pop level is reached.

The processors 1000 and 1010 communicate with the memories 1030 and 1040 and the display 1020 via a bus.

The memories 1030 and 1040 may further include a short stack for storing the address of a far child node at which the ray later arrives among two child nodes when the number of child nodes intersecting the ray is two.

When the short stack is included in each of the memories 1030 and 1040, the processors 1000 and 1010 may set a highest level among levels of one-bit stacks having bit values set to the first value to be a pop level, change a bit value of the one-bit stack corresponding to the pop level to the second value, pop the short stack at the pop level, move to a desired node, and traverse the desired node when a traversed node is a leaf node or the intersection test reveals that no child node intersects the ray.

Table 1 below shows an example of pseudocode representing the method of traversing a binary tree according to the example described above.

TABLE 1

| CAST-RAY(ray) |
| --- |
| 1  node <- ROOT |
| 2  bitstack <- (0, 0, ...) |
| 3  level <- 1 |
| 4  popLevel <- 0 |
| 5  while true |
| 6      while node is not leaf do |
| 7          intersect ray against children of node |
| 8          if both children were intersected then |
| 9              near <- child with smaller $t_{min}$ along the ray |
| 10             far <- child with greater $t_{min}$ along the ray |
| 11             if (level > poplevel \|\| bitstack[level] = 1 then |
| 12                 node <- near |
| 13                 bitstack[level] <- 1 |
| 14                 Push(far) |
| 15             else |
| 16                 node <- far |
| 17             end if |
| 18             level <- level +1 |
| 19         else if one child was intersected then |
| 20             if level ≠ popLevel && bitstack[level] = 0 then |
| 21                 node <- the child that was intersected |
| 22                 level <- level +1 |
| 23             else |

TABLE 1-continued

```
24              Pop( )
25           end if
26         else
27              Pop( )
28         end if
29      end while
30      intersect ray against primitives in node
31      shorten ray at end if closer primitives found
32      Pop( )
33   end while
Pop( )

1    if bitstack =0 then terminate traversal
2    popLevel <- largest i where bitstack[i] = 1
3    bitstack[poplevel] <- 0
4    level <- 1
5    if short stack is exhausted then
6         node <- ROOT
7    else
8         node <- pop short stack
9         level <- level + popLevel
10   end if
```

According to the examples described above, a restart method in which a hierarchical acceleration structure is traversed and an intersection test is conducted without using stacks may be efficiently improved. In other words, one-bit stacks may be used to traverse a tree consisting of a hierarchical acceleration structure, thereby decreasing the capacity of a stack memory required.

A method of traversing a binary tree according to the examples described above may be embodied as a computer program stored on a non-transitory computer-readable storage medium and performed using a general-purpose digital computer. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other non-transitory computer-readable storage medium known to one of ordinary skill in the art.

For example, a computer program including computer code for performing a method of traversing a binary tree in a ray tracing system may be stored in a non-transitory computer-readable storage medium that may be read by a computer.

In one example, the computer program includes computer code for testing whether child nodes intersect a ray while traversing the binary tree, wherein one-bit stacks are respectively assigned to levels of the binary tree; setting a bit of the one-bit stack assigned to a tree level of a parent node to a first value when the intersection test reveals that the number of child nodes intersecting the ray is two; setting a highest level among levels of the one-bit stacks having bit values set to the first value to be a pop level and changing a bit of the one-bit stack corresponding to the pop level to a second value when a traversed node is a leaf node or no child node intersects the ray; and beginning the traversal again starting from a root node, and traversing a node that has not yet been traversed among child nodes intersecting a ray at the pop level when the pop level is reached.

The examples described herein are to be considered in a descriptive sense only, and not for purposes of limitation. Descriptions of features or aspects within each example are to be considered as being applicable to other similar features or aspects in other examples.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of image generation implemented by traversing a binary tree in a ray tracing system having a processor, so as to generate an image, the method comprising:
   intersection testing, using the processor, whether child nodes intersect a ray while traversing the binary tree, wherein one-bit stacks are respectively assigned to levels of the binary tree;
   in response to the intersection testing revealing that a number of child nodes intersecting the ray is two, using the processor to perform a setting of a bit of the one-bit stack assigned to a tree level of a parent node to a first value and a pushing of one node of the child nodes to a stack;
   in response to a traversed node being a leaf node or no child node intersecting the ray, using the processor to perform a setting of a highest level among levels of the one-bit stack having bit values set to the first value to be a pop level and a changing of a bit of the one-bit stack corresponding to the pop level to a second value;
   using the processor to perform a beginning of the traversal again starting from a root node, and a traversing of a node that has not yet been traversed among child nodes intersecting a ray at the pop level when the pop level is reached so as to generate graphics of the image in accordance with a bit value of all of the one-bit stacks at the pop level corresponding to the second value; and
   displaying the image based on the generated graphics.

2. The method of claim 1, wherein the setting of the bit of the one-bit stack to the first value comprises:
   in response to the intersection testing revealing that both of the two child nodes intersect the ray, using the processor to perform a setting of the bit of the one-bit stack corresponding to the tree level of the parent node to the first value, a moving to a near child node at which the ray first arrives among the two child nodes, and a traversing of the near child node;
   in response to the intersection testing revealing that only one of the two child nodes intersects the ray, using the processor to perform moving to the child node intersecting the ray, and traversing of the child node; and
   in response to the intersection testing revealing that neither of the two child nodes intersects the ray, using the processor to perform checking of the bits of the one-bit stacks.

3. The method of claim 2, wherein the setting of the highest level to be the pop level and the changing of the bit of the one-bit stack corresponding to the pop level to be the second value comprise:
   using the processor to perform an ending of the traversing of the binary tree in response to all of the bits of the one-bit stacks having the second value; and in response to some of the bits of the one-bit stacks having the first value, using the processor to perform a setting of a highest level among the one-bit stacks having bit values set to the first value to the pop level, and a changing of the bit of the one-bit stack corresponding to the pop level to the second value.

4. The method of claim 3, wherein the beginning of the traversal again starting from the root node and the traversing of the node that has not yet been traversed comprise:
using the processor to perform a beginning of the traversal again starting from the root node, and testing whether child nodes intersect a ray at the pop level in response to the pop level being reached;
in response to a result of the testing of whether child nodes intersect the ray at the pop level revealing that two child nodes intersect the ray, using the processor to perform a moving to a far child node other than the near child node among the two child nodes, and traversing the far child node;
in response to the result of the testing of whether child nodes intersect the ray at the pop level revealing that only one of the two child nodes intersects the ray, using the processor to perform a the setting of the highest level to be the pop level and the changing of the bit of the one-bit stack corresponding to the pop level to the second value; and
using the processor to perform a detecting of an intersection point by checking whether a primitive and a ray intersect each other in response to a node that is currently being traversed being a leaf node, and a decreasing of the length of the ray in response to the intersection point being detected.

5. The method of claim 1, wherein the setting of the bit of the one-bit stack assigned to the tree level of the parent node to the first value is performed before traversing the child nodes intersecting the ray.

6. A method of image generation implemented by traversing a binary tree in a ray tracing system having a processor, so as to generate an image, the method comprising:
intersection testing, using the processor, whether child nodes intersect a ray while traversing the binary tree, wherein one-bit stacks are respectively assigned to levels of the binary tree;
in response to the intersection testing revealing that both of two child nodes intersect the ray, using the processor to perform a pushing of a far child node among the two child nodes to a short stack, a setting of a bit of the one-bit stack corresponding to a tree level of a parent node to a first value, and a moving to a near child node at which the ray first arrives among the two child nodes;
in response to the intersection testing revealing that only one of the two child nodes intersects the ray, using the processor to perform a moving to the child node intersecting the ray, and a traversing of the child node intersecting the ray;
in response to a traversed node being a leaf node or the intersection testing revealing that no child node intersects the ray, using the processor to perform a setting of a highest level among levels of the one-bit stacks having bit values set to the first value to be a pop level, and a changing of a bit of the one-bit stack corresponding to the pop level to a second value;
using the processor to perform a popping of the short stack at the pop level to move to a desired node, and a traversing of the desired node;
in response to the short stack being unoccupied, using the processor to perform a beginning of the traversal starting again from a root node, and a traversing of a node that has not yet been traversed among child nodes intersecting a ray at the pop level when the pop level is reached so as to generate graphics of the image in accordance with a bit value of all the one-bit stacks at the pop level corresponding to the second value; and
displaying the image based on the generated graphics.

7. The method of claim 6, wherein the beginning of the traversal starting again from the root node and the traversing of the node that has not yet been traversed comprise:
in response to the short stack being unoccupied, using the processor to perform a beginning the traversal again starting from the root node and checking whether child nodes intersect a ray at the pop level in response to the pop level being reached;
in response to a result of checking whether child nodes intersect the ray at the pop level revealing that both of two child nodes intersect the ray, using the processor to perform a moving to a far child node other than a near child node among the two child nodes, and a traversing of the far child node;
in response to the result of checking whether child nodes intersect the ray at the pop level revealing that only one of the two child nodes intersects the ray, using the processor to perform a setting of a highest level among levels of the one-bit stacks having bit values set to the first value to be the pop level, and a changing of a bit of the one-bit stack corresponding to the pop level to the second value;
using the processor to perform a beginning at the traversal again starting from the root node, and a traversing of a node that has not yet been traversed among child nodes intersecting a ray at the pop level in response to the pop level being reached; and
using the processor to perform a detecting of an intersection point by checking whether a primitive and a ray intersect each other in response to a node that is currently being traversed being a leaf node, and a decreasing of the length of the ray in response to the intersection point being detected.

8. An apparatus for generating an image by traversing a binary tree for ray tracing, the apparatus comprising:
a processor configured to traverse the binary tree for ray tracing;
a memory configured to store one-bit stacks respectively assigned to levels of the binary tree, and store the binary tree,
wherein the processor is further configured to:
test whether child nodes intersect a ray while traversing the binary tree;
set a bit of the one-bit stack assigned to a tree level of a parent node to a first value only in response to the test revealing that a number of child nodes intersecting the ray is two;
set a highest level among levels of the one-bit stacks having bit values set to the first value to be a pop level and change a bit of a one-bit stack corresponding to the pop level to a second value in response to a traversed node being a leaf node or no child node intersecting the ray; and
begin the traversal again starting from a root node, and traverse a node that has not yet been traversed among child nodes intersecting a ray at the pop level in response to the pop level being reached so as to generate graphics of the image in accordance with a bit value of all the one-bit stacks at the pop level corresponding to the second value; and a display to display the image based on the generated graphics.

9. The apparatus of claim 8, further comprising a bus;
wherein the processor is further configured to communicate with the memory and a display via the bus.

10. The apparatus of claim 8, wherein the memory comprises a short stack configured to store an address of a far child node at which the ray later arrives among two child nodes in response to the number of the child nodes intersecting the ray being two.

11. The apparatus of claim 10, wherein the processor is further configured to:
set a highest level among levels of the one-bit stacks having bit values set to the first value to be the pop level;
change a bit of the one-bit stack corresponding to the pop level to a second value;
pop the short stack at the pop level to move to a desired node; and
traverse the desired node in response to a traversed node being a leaf node or the test revealing that no child node intersects the ray.

12. A non-transitory computer-readable storage medium storing computer code to control one or more processing devices of a ray tracing system to implement a method of traversing a binary tree to generate an image to be displayed, the method comprising:
intersection testing whether child nodes intersect a ray while traversing the binary tree, wherein one-bit stacks are respectively assigned to levels of the binary tree;
setting a bit of the one-bit stack assigned to a tree level of a parent node to a first value in response to the intersection testing revealing that a number of child nodes intersecting the ray is two;
setting a highest level among levels of the one-bit stacks having bit values set to the first value to be a pop level and changing a bit of the one-bit stack corresponding to the pop level to a second value in response to a traversed node being a leaf node or no child node intersecting the ray;
beginning the traversal again starting from a root node, and traversing a node that has not yet been traversed among child nodes intersecting a ray at the pop level in response to the pop level being reached so as to generate graphics of the image in accordance with a bit value of all the one-bit stacks at the pop level corresponding to the second value; and
displaying the image based on the generated graphics.

13. An apparatus for traversing a tree for ray tracing, the apparatus comprising:
a processor configured to traverse the tree for ray tracing; and
a memory configured to store one-bit stacks respectively assigned to levels of the tree, and store the tree,
wherein the processor is further configured to:
test whether child nodes intersect a ray while traversing the tree;
set a bit of the one-bit stack assigned to a tree level of a parent node in response to a result of the test, including setting the bit of the one-bit stack to a first value in response to the test revealing that plural untraversed child nodes intersect the ray and before traversing the plural untraversed child nodes;
set a highest level among levels of the one-bit stacks having bit values set to the first value to be a pop level and change a bit of a one-bit stack corresponding to the pop level to a second value in response to a traversed node being a leaf node or no child node intersecting the ray; and
begin the traversal again starting from a root node, and traverse a node that has not yet been traversed among child nodes intersecting a ray at the pop level in response to the pop level being reached so as to generate graphics of the image in accordance with a bit value of all the one-bit stacks at the pop level corresponding to the second value;
a display to display the image based on the generated graphics.

14. The apparatus of claim 13, wherein when the bit of the one-bit stack is set to the first value a node of the plural untraversed child nodes is pushed to a short stack, and
wherein the setting of the highest level among levels of the one-bit stacks having bit values set to the first value to be the pop level further comprises popping the short stack at the pop level to move to a desired node and traversing the desired node.

15. The apparatus of claim 13, wherein the processor is configured to traverse one of the plural untraversed child nodes in response to the test revealing that plural child nodes intersect the ray, and the memory comprises a short stack configured to store an address of another of the plural untraversed child nodes, other than the one of the plural untraversed child nodes.

16. The apparatus of claim 15, wherein the processor is configured to traverse a child node of the plural untraversed child nodes, other than the one of the plural untraversed child nodes, based on an address stored in the short stack.

17. The apparatus of claim 13, wherein the processor is configured to traverse a nearer one of the plural untraversed child nodes in response to the test revealing that plural untraversed child nodes intersect the ray, and the memory comprises a short stack configured to store an address of another of the plural untraversed child nodes, other than the nearer one of the plural untraversed child nodes, at which the ray later arrives.

* * * * *